US012048954B2

(12) United States Patent
Vinci et al.

(10) Patent No.: US 12,048,954 B2
(45) Date of Patent: Jul. 30, 2024

(54) TIP FOR SCRAPING WITH FOCUSED HIGH VELOCITY AIR

(71) Applicants: Ian R. Vinci, Shandaken, NY (US); Peter R. Vinci, Shandaken, NY (US); Peter Vinci, Shandaken, NY (US)

(72) Inventors: Ian R. Vinci, Shandaken, NY (US); Peter R. Vinci, Shandaken, NY (US); Peter Vinci, Shandaken, NY (US)

( * ) Notice: Subject to any disclaimer, the term of this patent is extended or adjusted under 35 U.S.C. 154(b) by 549 days.

(21) Appl. No.: 17/302,726

(22) Filed: May 11, 2021

(65) Prior Publication Data

US 2021/0354176 A1 Nov. 18, 2021

Related U.S. Application Data

(60) Provisional application No. 62/704,600, filed on May 18, 2020.

(51) Int. Cl.
*B08B 5/02* (2006.01)
*B05B 1/00* (2006.01)
(Continued)

(52) U.S. Cl.
CPC ................ *B08B 5/02* (2013.01); *B05B 1/005* (2013.01); *B05B 15/16* (2018.02); *B08B 1/165* (2024.01); *B05B 12/002* (2013.01)

(58) Field of Classification Search
CPC ........... B05B 1/005; B05B 1/14; B05B 15/16; B08B 1/005; B08B 9/0808; B08B 9/0813;
(Continued)

(56) References Cited

U.S. PATENT DOCUMENTS 2,698,653 A 1/1955 Holloway
4,978,371 A * 12/1990 Smyrloglou ............ B03C 3/383 96/10

(Continued)

FOREIGN PATENT DOCUMENTS

JP 2004291614 A * 10/2004
WO WO-2017068613 A1 * 4/2017

OTHER PUBLICATIONS

Tezawa, Kazuhiro; "Air Nozzle"; WO 2017068613 (translation) (Year: 2017).*

(Continued)

*Primary Examiner* — Brian D Keller
*Assistant Examiner* — Sarah L Bundy
(74) *Attorney, Agent, or Firm* — LAW OFFICES OF MICHAEL L. WISE, LLC

(57) ABSTRACT

A scraping tip is attached to a blow gun. The scraping tip includes a neck and a head attached to the neck. The neck is hollow cylindrical and centered about a main longitudinal axis. The head has an internal cavity, a first angled face, a second angled face, a first nozzle, and a second nozzle. The internal cavity is in gaseous communication with an interior of the neck. The first angled face is in a first angled plane, while the second angled face is in a second angled plane. The first nozzle is hollow cylindrical, centered about a first longitudinal axis, merges with the internal cavity, and terminates in the first angled face. The second nozzle is hollow cylindrical, centered about a second longitudinal axis, merges with the internal cavity, and terminates in the second angled face. The scraping tip allows focused high velocity air to aid with scraping.

17 Claims, 3 Drawing Sheets

(51) Int. Cl.

| | |
|---|---|
| ***B05B 15/16*** | (2018.01) |
| ***B08B 1/00*** | (2024.01) |
| ***B08B 1/16*** | (2024.01) |
| *B05B 12/00* | (2018.01) |

(58) Field of Classification Search
CPC . B08B 5/02; A47L 13/02; A47L 13/08; B25D 9/08; A61C 17/00
USPC ........................................................ 15/309.11
See application file for complete search history.

(56) References Cited

U.S. PATENT DOCUMENTS

| | | | |
|---|---|---|---|
| 5,072,486 | A | 12/1991 | Guarascio |
| 2019/0090713 | A1 | 3/2019 | Krieg et al. |
| 2019/0343352 | A1 | 11/2019 | Stubbs |

OTHER PUBLICATIONS

Kato, Satoshi et al.; “Blow-Needle”; JP 2004291614 (translation) (Year: 2004).*

* cited by examiner

Fig. 1
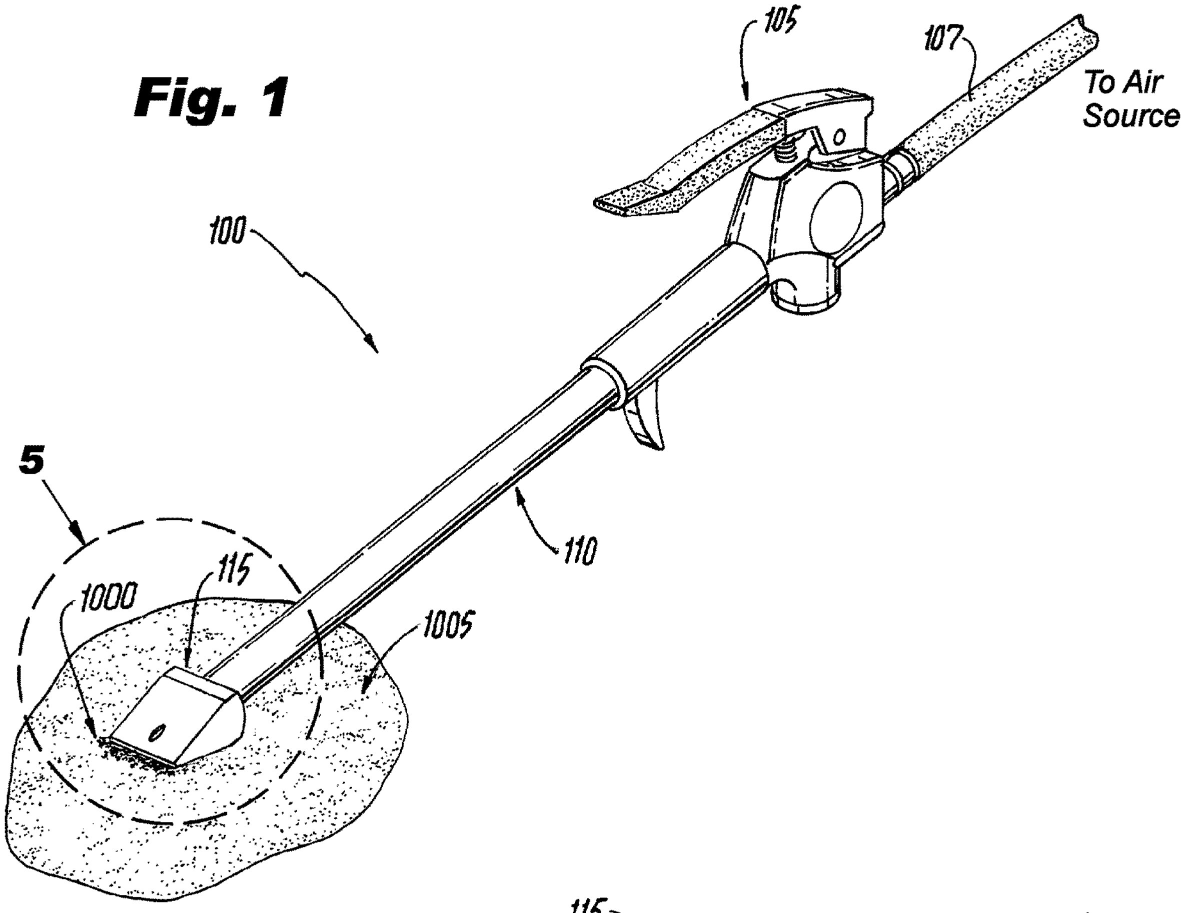
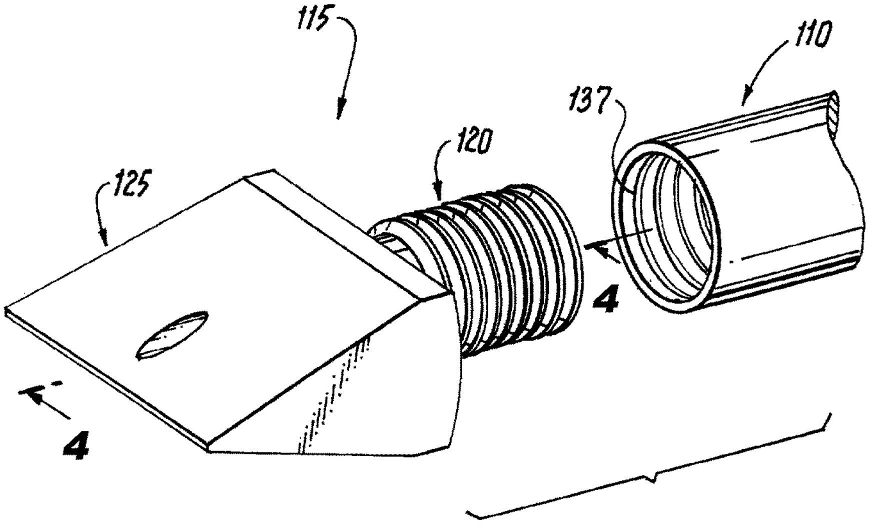
Fig. 2

TIP FOR SCRAPING WITH FOCUSED HIGH VELOCITY AIR

FIELD OF THE INVENTION

The present invention relates generally to apparatus for cleaning, and, more particularly, to apparatus for cleaning via the use of air flow.

BACKGROUND OF THE INVENTION

Scraping away old paint, dirt, and corrosion from a workpiece is a commonplace task in many garages and workshops. Nevertheless, scraping away such unwanted materials with manual scraping tools can be very time consuming, dirty, and fatiguing. As a result, there is a need for improved scraping tools that are better able to accomplish this unpleasant task.

SUMMARY OF THE INVENTION

Embodiments of the present invention address the above-identified need by providing an apparatus that utilizes focused high velocity air to aid with mechanical scraping.

Aspects of the invention are directed to an apparatus comprising a neck and a head attached to the neck. The neck is hollow cylindrical and centered about a main longitudinal axis. The head defines an internal cavity, a first angled face, a second angled face, a first nozzle, and a second nozzle. The internal cavity is in gaseous communication with an interior of the neck. The first angled face is in a first angled plane. The second angled face is in a second angled plane. The first nozzle is hollow cylindrical, centered about a first longitudinal axis, merges with the internal cavity, and terminates in the first angled face. The second nozzle is hollow cylindrical, centered about a second longitudinal axis, merges with the internal cavity, and terminates in the second angled face.

Additional aspects of the invention are directed to an apparatus comprising a blow gun, an extension tube attached to the blow gun, and a scraping tip attached to the extension tube. The scraping tip comprises a neck and a head attached to the neck. The neck is hollow cylindrical and centered about a main longitudinal axis. The head defines an internal cavity, a first angled face, a second angled face, a first nozzle, and a second nozzle. The internal cavity is in gaseous communication with an interior of the neck. The first angled face is in a first angled plane. The second angled face is in a second angled plane. The first nozzle is hollow cylindrical, centered about a first longitudinal axis, merges with the internal cavity, and terminates in the first angled face. The second nozzle is hollow cylindrical, centered about a second longitudinal axis, merges with the internal cavity, and terminates in the second angled face.

Advantageously, embodiments in accordance with aspects of the invention provide a scraping tip that utilizes high velocity air to aid in removing unwanted material from a workpiece both by helping to dislodge it and sweeping it away once the material has dis-attached. The high velocity air also keeps the narrow frontal edge of the scraping tip clean and devoid of debris that could reduce its effectiveness.

BRIEF DESCRIPTION OF THE DRAWINGS

Features, aspects, and advantages of the present invention will become better understood with regard to the following description and accompanying drawings where:

FIG. 1 shows a perspective view of an apparatus in accordance with an illustrative embodiment of the invention while the apparatus is being used to clean unwanted materials from workpiece;

FIG. 2 shows an exploded perspective view of the FIG. 1 scraping tip and the extension tube;

DETAILED DESCRIPTION OF THE INVENTION

Figure 3:
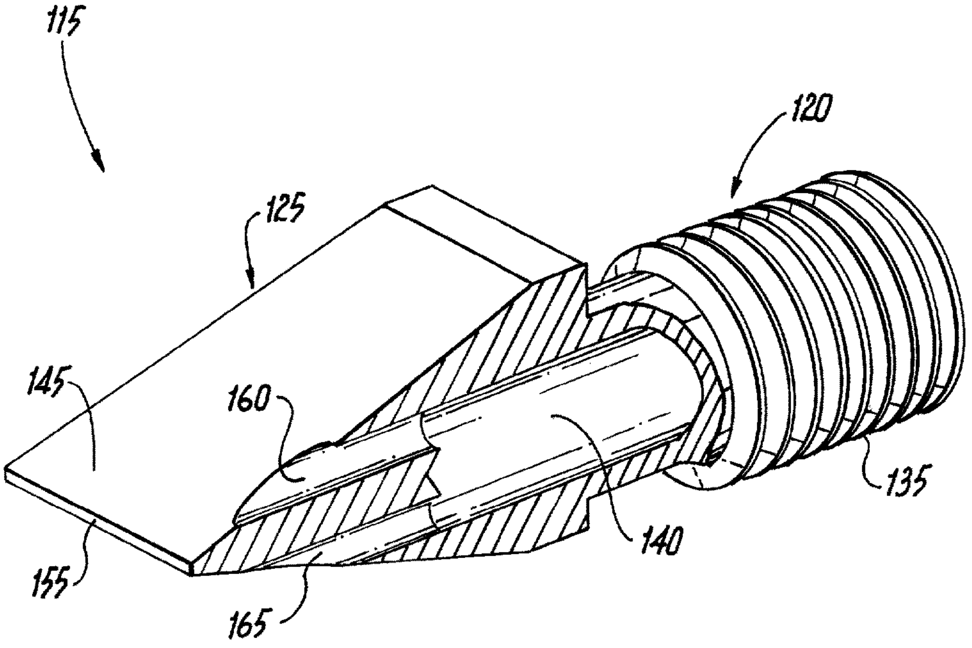
FIG. 3 shows a partial sectional view of the FIG. 1 scraping tip.

The present invention will be described with reference to illustrative embodiments. For this reason, numerous modifications can be made to these embodiments and the results will still come within the scope of the invention. No limitations with respect to the specific embodiments described herein are intended or should be inferred.

As use herein and in the appended claims, "substantially parallel" means parallel within plus or minus ten degrees. The term "blow gun" includes any handheld device capable of modulating the flow of compressed air through itself in response to a user-operated control.

FIG. 1 shows a perspective view of an apparatus 100 in accordance with an illustrative embodiment of the invention while the apparatus 100 is being used to clean unwanted materials 1000 from a workpiece 1005. The apparatus 100 comprises a blow gun 105, an air hose 107, an extension tube 110, and a scraping tip 115. In use, pressurized air is routed to the blow gun 105 via the air hose 107 from a source of compressed air such as an air compressor. The blow gun 105 is then used to send the pressurized air through the extension tube 110 to the scraping tip 115. The scraping tip 115 is used to scrape the unwanted materials 1000 from the workpiece 1005 with assistance from the compressed air.

Figure 4:
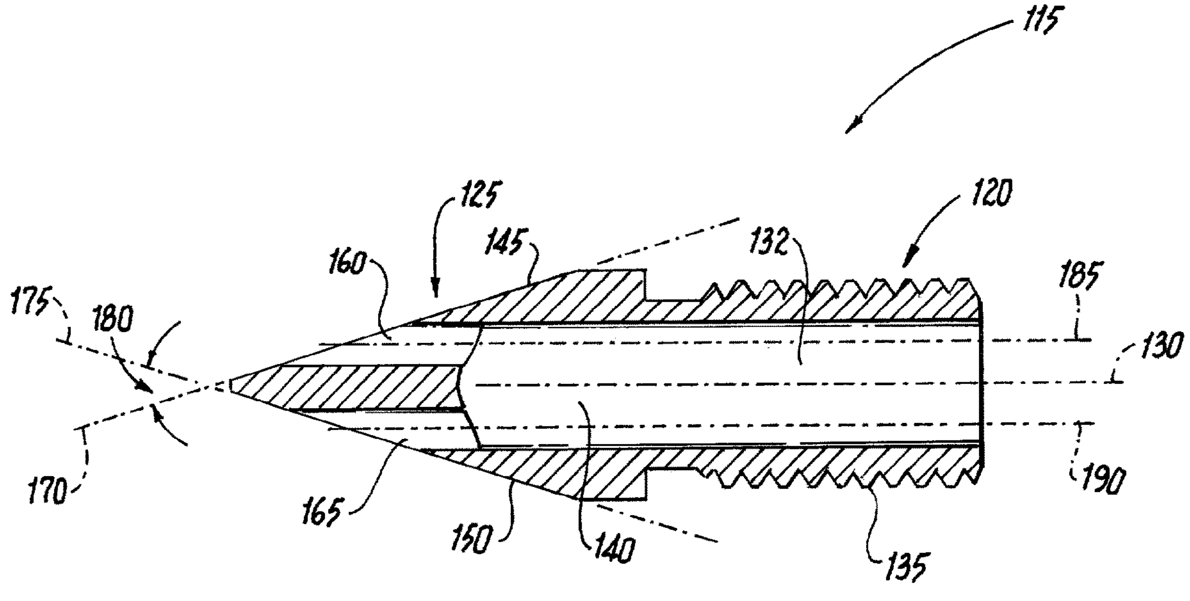
FIG. 4 shows a sectional view of the FIG. 1 scraping tip along the cleave plane indicated in FIG. 2.

Additional aspects of the scraping tip 115 are provided in FIGS. 2-4. FIG. 2 shows an exploded perspective view of the scraping tip 115 and the extension tube 110, while FIG. 3 shows a partial sectional view of the scraping tip 115. FIG. 4 shows a sectional view of the scraping tip 115 along the cleave plane indicated in FIG. 2.

The scraping tip 115 comprises a neck 120 and a head 125. The neck 120 is hollow cylindrical and is centered about a main longitudinal axis 130, thereby defining an interior volume 132. The neck 120 is also partially externally threaded with threads 135 so that the scraping tip 115 may be removably attached to the extension tube 110, which includes corresponding internal threads 137.

The head 125 defines an internal cavity 140, a first angled face 145, a second angled face 150, a narrow frontal edge 155, a first nozzle 160, and a second nozzle 165. Externally, the first angled face 145 and the second angled face 150 are angled away from the neck 120, and both terminate in the narrow frontal edge 155. The first angled face 145 occupies a first angled plane 170, and the second angled face 150 occupies a second angled plane 175. In the present embodiment, an angle 180 between the first angled plane 170 and the second angled plane 175 is about 35 degrees.

Inside, the internal cavity 140 in the head 125 merges with the interior volume 132 of the neck 120, and thus the internal cavity 140 is in gaseous communication with the interior volume 132. The first nozzle 160 merges with the internal cavity 140 at one end and terminates in the first angled face 145 at its other end. The first nozzle 160 is hollow cylindrical and is centered about a first longitudinal axis 185. Likewise, the second nozzle 165 merges with the internal cavity 140, terminates in the second angled face 150, and is hollow cylindrical about a second longitudinal axis 190. Both the first longitudinal axis 185 and the second longitudinal axis 190 are substantially parallel to the main longitudinal axis 130 but are in spaced relation from the main longitudinal axis 130 and from each other.

With the first nozzle 160 and the second nozzle 165 arranged in this manner, the air leaving the first nozzle 160 and the second nozzle 165 tends to be travelling in about the same direction that it was when entering the scraping tip 115, that is, in a direction parallel to the main longitudinal axis 130. However, the velocity of the air leaving the first nozzle 160 and the second nozzle 165 is substantially higher than it was entering the scraping tip 115 given that the air entering the scraping tip 115 is forced to exit the much smaller first nozzle 160 and second nozzle 165. In one or more embodiments, for example, the neck 120 may have an interior diameter of 0.19 inches (providing an area of about $2.8\times10^{-2}$ square inches), while each of the first nozzle 160 and the second nozzle 165 may have an internal diameter of only 0.063 inches (providing a combined area of about $6.2\times10^{-3}$ square inches).

Figure 5:
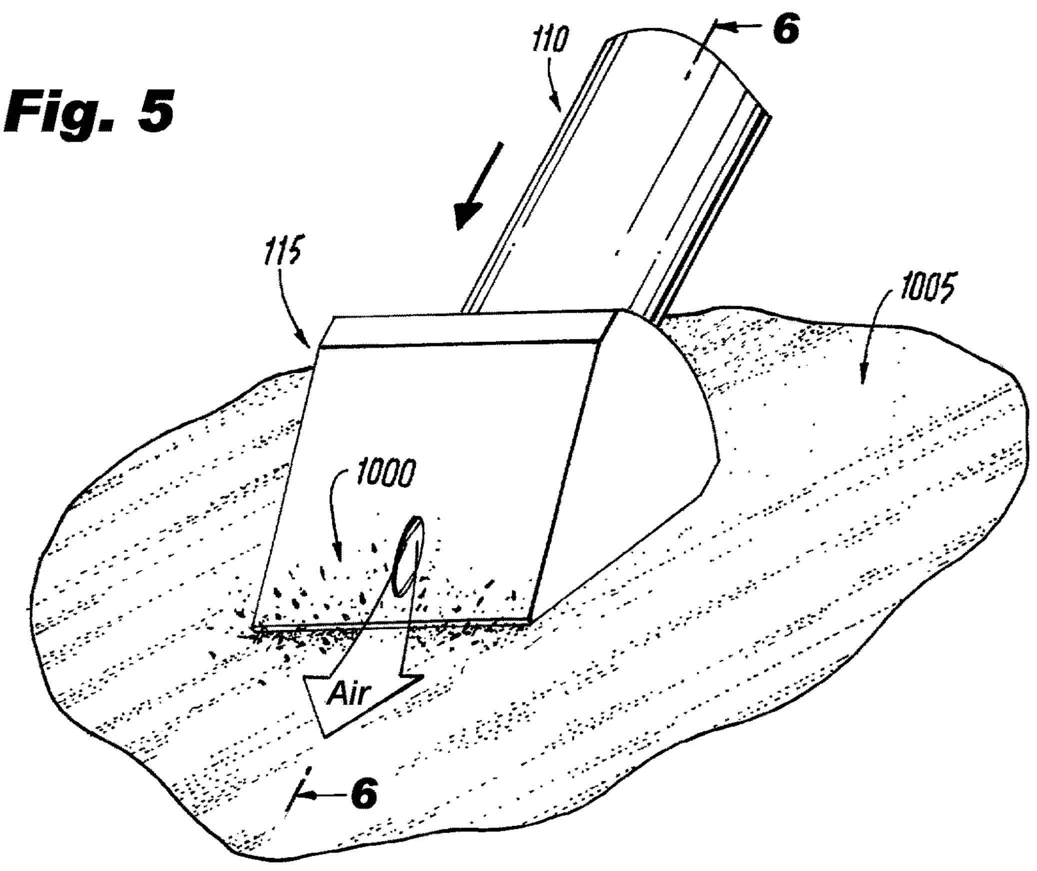
FIG. 5 shows a perspective view of the portion of the FIG. 1 apparatus circled in FIG. 1 while the apparatus is being used to clean the unwanted materials from the workpiece.
Figure 6:
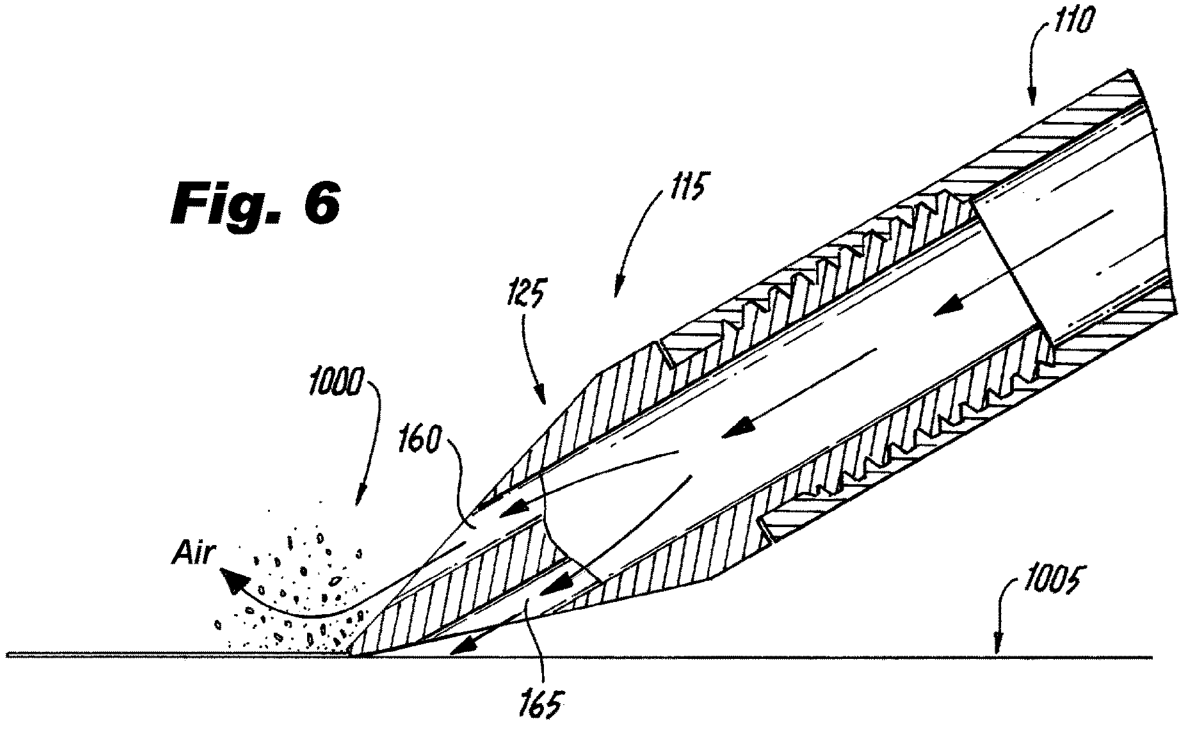
FIG. 6 shows a sectional view of the portion of the FIG. 1 apparatus circled in FIG. 1 along the cleave plane indicated in FIG. 5 while the apparatus is being used to clean the unwanted materials from the workpiece.

FIGS. 5 and 6 show aspects of the apparatus 100 while the apparatus is being used to clean the unwanted materials 1000 from the workpiece 1005. FIG. 5 shows a perspective view of the portion of the apparatus 100 circled in FIG. 1, while FIG. 6 shows a sectional view the same portion. In use, the blow gun 105 is attached to a source of compressed air (e.g., an air compressor) and the blow gun 105 is used to modulate the compressed air being delivered to the scraping tip 115 through the extension tube 110. To aid with scraping, the first angled face 145 cooperates with the second angled face 150 to create the narrow frontal edge 155, which is sharp enough to get under and dislodge the unwanted materials 1000 on the workpiece 1005. Meanwhile, high velocity air is focused onto the workpiece 1005 by the first nozzle 160 and the second nozzle 165. The high velocity air aids in removing the unwanted materials 1000 from the workpiece 1005 by both helping to dislodge it and sweeping it away once the material has dis-attached. The high velocity air also helps keep the narrow frontal edge 155 of the scraping tip 115 clean and devoid of debris that could reduce its effectiveness. In such a manner, the scraping function provided by the apparatus 100 corresponds to mechanical scraping aided by focused high velocity air.

It was mentioned above that, in the illustrative apparatus 100, the first angled plane 170 forms an angle (i.e., the angle 180) of about 35 degrees with the second angled plane 175. However, this particular value for the angle 180 is meant solely to be illustrative and is not intended to be limiting. That said, it has been empirically observed that angles less than about 45 degrees are best for providing an apparatus like the apparatus 100 with good scraping capabilities and a robust narrow frontal edge 155 that will survive extensive use while remaining sharp. Therefore, angles less than 45 degrees are preferred.

Once understood from the description provided herein, the apparatus 100, and more generally apparatus in accordance with aspects of the invention, may be manufactured utilizing conventional manufacturing techniques that will already be familiar to one having ordinary skill in the relevant manufacturing arts. If the apparatus 100 is formed of metal (e.g., steel, brass, etc.), it may be formed by casting, milling, or some combination thereof. These metal forming techniques, and others that may be used to form the apparatus 100, are described in a number of readily available publications, including, for example, J. Beddoes et al., *Principles of Metal Manufacturing Processes*, Butterworth-Heinemann, 2003, which is hereby incorporated by reference herein.

At the same time, suitable blow guns may be obtained commercially. For example, suitable blow guns may be sourced from W.W. GRAINGER INC. (Lake Forest, IL, USA; GRAINGER is a registered trademark).

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art.

For example, rather than only having two nozzles like the scraping tip 115, a scraping tip in accordance with alternative embodiments of the invention might include more than two nozzles. Having a greater number of nozzles allows the width of the head of the scraping tip to be made wider. Thus, while the scraping tip 115 might have a width of about 0.75 inches, an alternative scraping tip with four nozzles (i.e., two on each angled face) might be substantially wider than that (e.g., 1.5 inches).

Moreover, if so desired, the narrow frontal edge 155 in the scraping tip 115 may be eliminated to create an even sharper edge at the juncture of the first angled face 145 and the second angled face 150.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

Any element in a claim that does not explicitly state "means for" performing a specified function or "step for" performing a specified function is not to be interpreted as a "means for" or "step for" clause as specified in AIA 35 U.S.C. § 112(f). In particular, the use of "steps of" in the claims herein is not intended to invoke the provisions of AIA 35 U.S.C. § 112(f).

What is claimed is:

1. An apparatus comprising:

a neck that is hollow cylindrical and centered about a main longitudinal axis; and a head attached to the neck and defining:

an internal cavity in gaseous communication with an interior of the neck;

a first angled face in a first angled plane;

a second angled face in a second angled plane, the first angled face and the second angled face terminating in a straight frontal edge elongated in a direction normal to the main longitudinal axis;

a first nozzle that is hollow cylindrical, centered about a first longitudinal axis, merges with the internal cavity, and terminates in the first angled face; and a second nozzle that is hollow cylindrical, centered about a second longitudinal axis, merges with the internal cavity, and terminates in the second angled face.

2. The apparatus of claim 1, wherein the neck is at least partially externally threaded.

3. The apparatus of claim 1, further comprising an extension tube attached to the neck.

4. The apparatus of claim 3, wherein the extension tube is at least partially internally threaded and threadably engages the neck.

5. The apparatus of claim 1, wherein the first angled plane and the second angled plane form an angle less than forty-five degrees.

6. The apparatus of claim 1, wherein the first longitudinal axis and the second longitudinal axis are in spaced relation to each other and to the main longitudinal axis.

7. The apparatus of claim 1, wherein the first longitudinal axis and the second longitudinal axis are substantially parallel to the main longitudinal axis.

8. The apparatus of claim 1, wherein each of the first nozzle and the second nozzle have a respective internal diameter smaller than an internal diameter of the neck.

9. An apparatus comprising:

a blow gun;

an extension tube attached to the blow gun; and a scraping tip attached to the extension tube and comprising:

a neck that is hollow cylindrical and centered about a main longitudinal axis; and a head attached to the neck and defining:

an internal cavity in gaseous communication with an interior of the neck;

a first angled face in a first angled plane;

a second angled face in a second angled plane, the first angled face and the second angled face terminating in a straight frontal edge elongated in a direction normal to the main longitudinal axis;

a first nozzle that is hollow cylindrical, centered about a first longitudinal axis, merges with the internal cavity, and terminates in the first angled face; and a second nozzle that is hollow cylindrical, centered about a second longitudinal axis, merges with the internal cavity, and terminates in the second angled face.

10. The apparatus of claim 9, wherein the neck is at least partially externally threaded.

11. The apparatus of claim 10, wherein the extension tube is at least partially internally threaded and threadably engages the neck.

12. The apparatus of claim 9, wherein the first angled plane and the second angled plane form an angle less than forty-five degrees.

13. The apparatus of claim 9, wherein the first longitudinal axis and the second longitudinal axis are in spaced relation to each other and to the main longitudinal axis.

14. The apparatus of claim 9, wherein the first longitudinal axis and the second longitudinal axis are substantially parallel to the main longitudinal axis.

15. The apparatus of claim 9, wherein:

the blow gun is attached to a source of compressed air; and the blow gun is operative to modulate compressed air delivered to the scraping tip through the extension tube.

16. The apparatus of claim 15, wherein compressed air delivered to the scraping tip exits the first nozzle and the second nozzle.

17. The apparatus of claim 15, wherein compressed air exiting the first nozzle and the second nozzle exits at a higher velocity than compressed air entering the scraping tip.

* * * * *